(12) United States Patent
Vogel

(10) Patent No.: US 8,346,085 B2
(45) Date of Patent: Jan. 1, 2013

(54) DUAL-FILTER OPTICAL NETWORK INTERFACE UNIT AND METHOD OF REMOVING NOISE USING SAME

(75) Inventor: Mark Vogel, Statesville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 712 days.

(21) Appl. No.: 12/427,475

(22) Filed: Apr. 21, 2009

(65) Prior Publication Data

US 2009/0263134 A1 Oct. 22, 2009

Related U.S. Application Data

(60) Provisional application No. 61/046,919, filed on Apr. 22, 2008.

(51) Int. Cl.
*H04J 14/02* (2006.01)
*H04B 10/00* (2006.01)

(52) U.S. Cl. .......................... 398/79; 398/135

(58) Field of Classification Search .......................... None
See application file for complete search history.

(56) References Cited

U.S. PATENT DOCUMENTS

| | | | |
|---|---|---|---|
| 6,058,235 A * | 5/2000 | Hiramatsu et al. | 385/135 |
| 6,321,384 B1 | 11/2001 | Eldering | |
| 7,595,888 B2 * | 9/2009 | Chang et al. | 356/454 |
| 7,949,256 B2 * | 5/2011 | Bouda et al. | 398/66 |
| 2003/0161583 A1 | 8/2003 | Kuhara | |
| 2003/0180049 A1 * | 9/2003 | Park | 398/72 |
| 2004/0208562 A1 * | 10/2004 | Ufongene | 398/59 |
| 2005/0013614 A1 | 1/2005 | Ota et al. | |
| 2005/0286895 A1 * | 12/2005 | Lee et al. | 398/79 |
| 2008/0031625 A1 | 2/2008 | Okuda et al. | |
| 2009/0010648 A1 * | 1/2009 | Zuhdi | 398/58 |
| 2009/0226171 A1 * | 9/2009 | Liu et al. | 398/82 |
| 2010/0135619 A1 * | 6/2010 | Choi et al. | 385/88 |

OTHER PUBLICATIONS

Talli G. et al.; "Filter Impact in Spectrally-Broadened Rayleigh Noise Reduction Schemes for DWDM-PONs"; Optical Fiber Communication Conference and Exposition National Fiber Optic Engineers Conference; OFCNFOEC 2007; Anaheim, CA, USA; IEEE; Mar. 1, 2007 pp. 1-3.

* cited by examiner

*Primary Examiner* — Kenneth N Vanderpuye
*Assistant Examiner* — Abbas H Alagheband
(74) *Attorney, Agent, or Firm* — Muncy, Geissler, Olds & Lowe, PLLC

(57) ABSTRACT

A network interface unit includes an input for receiving downstream signals from an optical fiber, an optical pathway leading from the input, a laser connected to the optical pathway for transmitting upstream signals in a first wavelength band, and a receiver for receiving downstream signals in a second wavelength band that doesn't overlap with the first wavelength band. A first filter is provided for filtering signals in a third wavelength band from the optical pathway before signals in the third wavelength band reach the receiver, and a second filter is provided between the input and the laser for filtering signals in a fourth wavelength band from the optical pathway, the fourth wavelength band not overlapping with the first wavelength band or the third wavelength band, and an arrangement is also provided for preventing processing of the fourth wavelength band downstream of the second filter. Also a filtering method.

19 Claims, 3 Drawing Sheets

DUAL-FILTER OPTICAL NETWORK INTERFACE UNIT AND METHOD OF REMOVING NOISE USING SAME

CROSS-REFERENCE TO RELATED APPLICATIONS

The present application claims the benefit of U.S. Provisional Patent Application No. 61/046,919, filed Apr. 22, 2008, the entire contents of which is hereby incorporated by reference.

FIELD OF THE INVENTION

The present invention is directed toward a network interface unit (NIU) having a laser for transmitting signals in an upstream direction and at least two filters for substantially preventing downstream signals in at least two wavelength bands from impinging on the laser and toward a method of filtering an optical signal, and, more specifically, toward an optical NIU having a first filter for removing a first band of wavelengths from an optical pathway for use by a receiver and a second filter for removing a second, different, band of wavelengths from the optical pathway, which second band may include unwanted optical signals, to substantially prevent the first and second bands of wavelengths from reaching a laser in the NIU and toward a related filtering method.

BACKGROUND OF THE INVENTION

An optical network interface unit (NIU) comprises an enclosure that houses equipment for converting optical signals on an incoming fiber optic cable into electrical signals that can be used by a local network. In a fiber-to-the-home (FTTH) environment, the NIU marks the division between the outside fiber plant controlled by a service provider and the customer-owned network wiring. Typical NIU's thus include a first input for receiving a fiber optic cable and a second input for receiving an electrical conductor, often a coaxial cable. Also included in the NIU is an optical-to-electrical converter for converting optical signals received on the fiber to electrical signals that can be transmitted over a coaxial cable. This may include, for example, a photodiode that outputs electrical signals in response to received optical signals. The NIU may also include a laser for converting electrical signals received from the home network into optical signals and transmitting those optical signals upstream over the fiber optic cable.

It is known to use a single fiber optic cable for transmitting optical signals from a head end to a home and for transmitting optical signals from the home back to the head end. The direction from the head end to the home may be referred to herein as the "downstream" direction, and the direction from the home to the head end may be referred to as the "upstream" direction. In order to do this, the downstream transmissions typically take place using a first wavelength or band of wavelengths and upstream transmissions take place using a second wavelength or band of wavelength spaced from the first band of wavelengths. The downstream transmissions may be produced by one of a small number of relatively expensive lasers that are maintained in a temperature-controlled environment in the head end, which lasers can transmit in a relatively narrow band of wavelengths without significant drift. Such transmissions may take place for example, at a particular wavelength in a band of wavelengths from about 1550 to 1560 nanometers. Upstream transmissions are produced by less expensive lasers which may experience significant drift in the band of wavelengths in which they transmit. This drift may be increased if the upstream transmitting laser is mounted in an outdoor NIU and subject to temperature fluctuations, because the temperature at which some lasers operate affects their transmission wavelength. These transmissions nominally take place in a band of frequencies near 1310 nanometers, but which may be as broad as 1260 to 1360 nanometers to accommodate variations in the wavelengths of the transmitting lasers. It is also known, alternately, to send upstream transmissions in the 1565 to 1625 nanometer band of wavelengths, above the band of wavelengths often used for downstream transmissions.

The downstream optical signals received at the NIU may include wavelengths outside the band of wavelengths intended for the optical-electrical converter. For example, erbium doped fiber amplifiers (EDFA's) in a transmission system sometimes produce wideband noise that may reach the NIU. Fiber backscatter may also occur in a typical downstream transmission. Reflection points in a network, such as connectors in the system, may reflect the backscattered light in a forward direction toward the NIU. Some of this light may be directed toward the receiver in the NIU if the reflected signal falls within the range of wavelengths removed by the filter. Other portions of this reflected signal can reach the laser in the NIU, and this unwanted signal impinging on the laser may degrade the performance of upstream laser transmissions. It would therefore be desirable to reduce the effects of unwanted downstream optical signals on the NIU and in particular, on the laser in the NIU, without interfering with downstream transmissions intended for the receiver in the NIU.

SUMMARY OF THE INVENTION

These problems and others are addressed by embodiments of the present invention, a first aspect of which comprises a network interface unit (NIU) that includes an input for receiving downstream signals from an optical fiber and an optical pathway leading from the input to a laser that transmits upstream signals on the optical pathway in a first wavelength band. The NIU also includes a receiver for receiving downstream signals in a second wavelength band that doesn't overlap with the first wavelength band. A first filter is provided between the input and the receiver for filtering signals in a third wavelength band from the optical pathway before those signals reach the receiver, and the third wavelength band includes the second wavelength band. A second filter is provided between the input and the laser for filtering signals in a fourth wavelength band that doesn't overlap with the first wavelength band or the third wavelength band. An arrangement is also provided for preventing the processing of the fourth wavelength band downstream of the second filter.

Another aspect of the invention comprises a method involving a network interface unit (NIU) having an input for receiving signals from a fiber optic cable, a laser configured to produce light in a first wavelength band, and an optical path from the input to the laser. The method includes receiving signals on the optical path from the NIU input, extracting a second wavelength band (that doesn't overlap with the first wavelength band) from the optical path and directing the second wavelength band to a network component for further processing. The method also includes extracting a third wavelength band that doesn't overlap with the first and second wavelength bands from the optical path and dissipating the signals or impairments in the extracted third wavelength band after extracting the third wavelength band from the optical path without processing the signals in the extracted third wavelength band.

A further aspect of the invention comprises an NIU that includes an input for receiving downstream signals from an optical fiber, a laser for transmitting upstream signals on the optical fiber in a first wavelength band and an optical pathway from the input to the laser. The NIU also includes a receiver for receiving signals in a second wavelength band that doesn't overlap with the first wavelength band and a first filter between the input and the receiver for removing signals in a third wavelength band from the optical pathway before the signals in the third wavelength band reach the receiver. The third wavelength band includes the second wavelength band. The NIU also includes a second filter between the input and the laser for removing unwanted optical signals from the optical pathway in a fourth wavelength band that doesn't overlap with the first wavelength band or the third wavelength band.

BRIEF DESCRIPTION OF THE DRAWINGS

These and other benefits will be better understood after a reading of the following detailed description together with the attached drawings.

DETAILED DESCRIPTION

Figure 1:
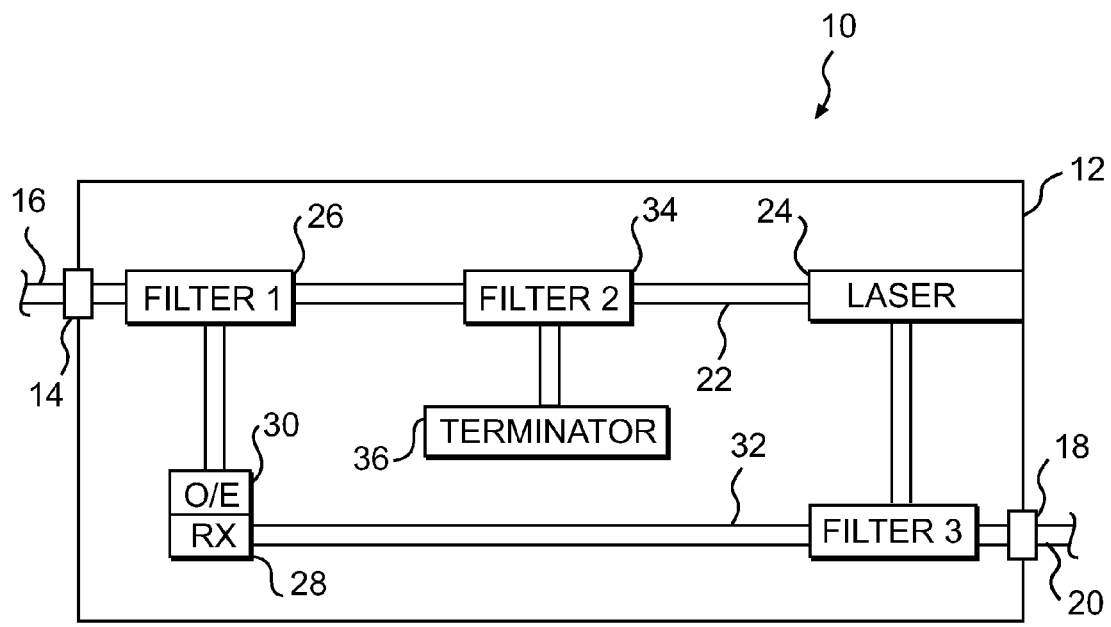
FIG. 1 is a schematic illustration of a network interface unit (NIU) according to an embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
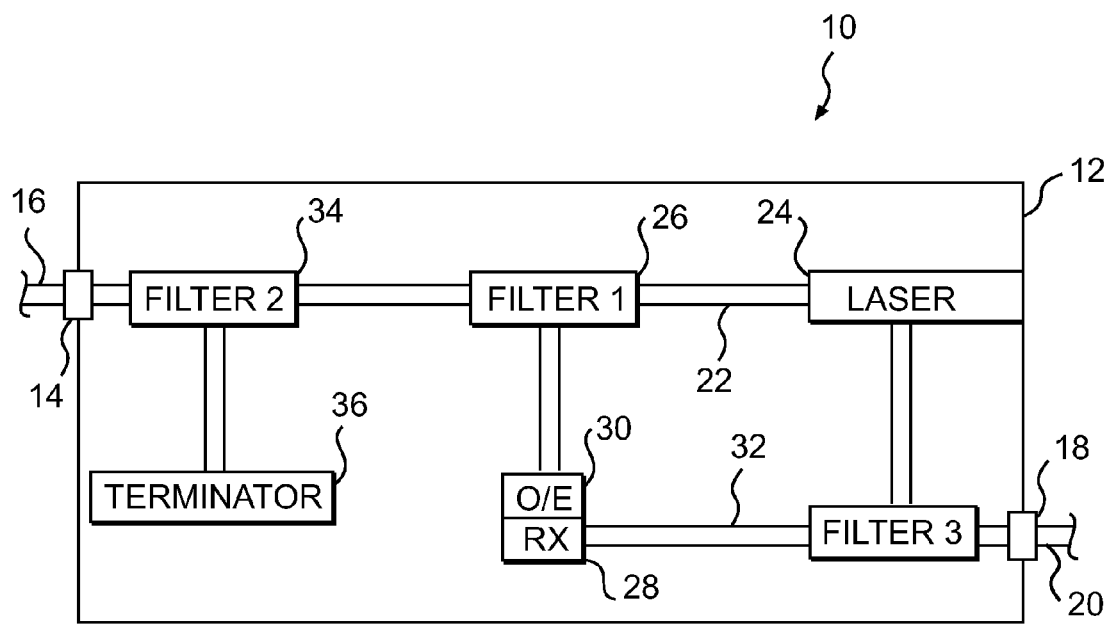
FIG. 2 is a schematic illustration of an NIU according to another embodiment of the present invention.

FIG. 1 illustrates a network interface unit (NIU) 10 that includes a housing 12 that may be weatherproof, for example, and that is mountable in an exterior location such as on an outside wall of a home. NIU 10 includes an optical input/output 14 to which a fiber optic cable 16 may be connected by a suitable connector (not illustrated) and an electrical input/output 18 to which an electrical connector such as coaxial cable 20 can be connected. The NIU interior includes an optical pathway 22 connected to optical input/output 14 to carry signals between the optical input/output 14 and a laser 24. The optical pathway includes a first filter 26, described in greater detail below, between the optical input/output and a receiver 28. The receiver 28 may comprise an optical-to-electrical converter 30 for converting incoming optical signals on fiber optic cable 16 into electrical signals that are output onto an electrical pathway 32 connected to electrical input/output 18. The optical pathway also includes a second filter 34 between the optical input/output 14 and the laser 24 which is also described below. Second filter 34 may be located between the first filter 26 and laser 24 as illustrated in FIG. 1 or, alternately, between the NIU optical input/output 14 and the first filter 26 as illustrated in FIG. 2. In the latter case, the second filter 34 may also reduce the effect of unwanted downstream optical signals or optical energy on receiver 28 if these unwanted signals or optical energy removed by second filter 34 would have been directed toward receiver 28 by first filter 26 due to the particular bands of wavelengths removed by each filter. The term "impairment" may be used herein to generically describe optical energy including noise, signals, and other light in a fiber other than desired signals.

The characteristics of first filter 26 are selected so that signals produced by laser 24 and transmitted in the upstream direction pass freely through the first filter 26 as they are transmitted toward the head end. Suitable filters are available as "drop/add modules" which are sold for removing selected bands of wavelengths from a fiber optic cable. Meanwhile, downstream signals in a second band of wavelengths are diverted from optical pathway 22 by first filter 26 toward receiver 28 so that signals in at least a portion of the second band of wavelengths can be converted into electrical signals that will be output over electrical input/output 18. For example, if laser 24 is configured to transmit at a wavelength of approximately 1310 nanometers, the first band of wavelengths may comprise wavelengths near 1310 nanometers, for example, 1260 to 1360 nanometers.

The second band of wavelengths may comprise all wavelengths greater than 1550 nanometers. The third band of wavelengths, comprising a portion of the second band of wavelengths, may be signals at 1550 to 1560 nanometers, for example, that receiver 28 is configured to process. Sending all signals above a given wavelength toward receiver 28, including signals at wavelengths above the third band of wavelengths that receiver 28 is configured to process, allows for the use of a relatively inexpensive high pass filter as first filter 26. In this case, all signals below the lower end of the second band of wavelengths, signals having wavelengths below 1550 nanometers, for example, will be affected minimally if at all by the first filter and will continue to travel along optical pathway 22 toward laser 24, while signals in the 1550 to 1560 nanometer range will be directed toward receiver 28.

Alternately, first filter 26 may comprise a band pass filter configured to pass a band of wavelengths near the nominal frequency at which a head end transmitter transmits. Using a band pass filter, the third band of wavelengths may comprise substantially all the second band of wavelengths that are passed by the first filter 26 toward the receiver 28. In this case, all wavelengths below approximately 1550 nanometers and above approximately 1560 nanometers will be minimally affected by the first filter 26 and will continue along toward laser 24.

Signals other than those in the third band of wavelengths may reach NIU 10. These signals may be caused, for example, by various sources of noise in the system. Erbium-doped fiber amplifiers (EDFA's) may be included in an optical transmission system, for example, to amplify light being sent over a fiber optic cable and extend the reach of a system. Such amplifiers may introduce wideband noise which will propagate until it reaches the receiver 28 or the laser 24. Furthermore, the noise generated by the EDFA may interact with the 1550 nanometer downstream signals and produce additional noise. Noise can also be caused by backscatter from the downstream signal. While this backscatter is traveling in an upstream direction, away from the NIU 10, reflection points in the system, such as various connectors (not shown) can reflect the backscattered light back toward NIU 10. If any of this noise falls into the second band of wavelengths, it may reach receiver 28 and adversely affect the performance of the receiver 28 or degrade the electrical signal that is output from receiver 28. If the noise falls outside the second band of wavelengths, it may reach laser 24, and this can adversely affect the performance of the laser 24.

If the light noise reaching the laser 24 is more than about 35 nanometers shorter that the transmission wavelength of laser 24, material in the laser 24 may absorb the light, and this may increase gain in the laser 24. This is equivalent to an additional current injected into the laser 24 and might increase the optical output power of the laser 24. If the reflection is intensity modulated, this modulation might be transferred onto the upstream laser 24, although with less than 100 percent efficiency.

If the light noise reaching the laser 24 is within about 35 nm (longer or shorter) of the transmission wavelength of the laser 24, the reflected light may be amplified instead of absorbed. This may cause the same effects as an additional current being injected into the laser 24. Inputting this light into laser 24 may decrease the stimulated emission of light in the laser 24 and may decrease the carrier density making it substantially equivalent to a negative current source, potentially reducing the optical output of the laser 24. The effect may be stronger if the wavelength of the reflected light falls on a mode of the upstream laser 24 and if the laser 24 is a Fabry-Perot type laser with a comb pattern of evenly spaced modes. If the reflected light is near to a mode of laser 24, the induced carrier change can alter the laser's refractive index as well as the laser's gain, and pull the mode into alignment with the wavelength of the noise. This may induce amplitude variations of the output light of the laser 24.

If the light reaching the laser is at a wavelength more than about 40 nanometers greater than the transmission wavelength of the upstream laser 24, the light may still affect the output of the laser 24, but the effects will be less significant than those caused by light near or below the transmission wavelength of the laser 24.

To reduce the effects of noise in the system on laser 24, second filter 34 is selected to remove a fourth band of wavelengths from the optical pathway 22. This fourth band of wavelengths may comprise a band having wavelengths below the transmission wavelength of the laser 24, below 1310 nanometers, for example, or a band having a first region below 1310 nanometers and a second region above 1310 nanometers. The "second filter" may comprise a plurality of filters, as needed, to remove the desired bands of wavelengths. When selecting a filter for filtering wavelengths near 1310 nanometers, however, care must be taken to avoid filtering wavelengths in which the laser 24 may transmit, given the potential for the transmission wavelength of these upstream transmitting lasers to drift. If laser 24 were maintained in a controlled temperature environment or was otherwise configured to transmit in a narrow range of wavelengths, it might be possible to filter out all wavelengths within an arbitrarily small distance of either side of the 1310 transmission frequency to substantially prevent these wavelengths from reaching laser 24. However, given the variability of NIU lasers such as laser 24, especially when used in an outdoor environment, it may be desirable to leave at least a 20 nanometer or greater range around the 1310 nanometer (or other nominal upstream transmission wavelength) unfiltered.

The fourth band of wavelengths may also comprises nearly any portion of the band of wavelengths between the first band of wavelengths at which upstream laser 24 transmits and the second band of wavelengths that are removed from optical pathway 22 by first filter 26. For example, the band of wavelengths above 1365 nm and below 1550 nm, or a sub-portion thereof, could be filtered to reduce the effect of noise in this band on receiver 28 and/or laser 24.

As the need for bandwidth increases, system operators may add additional transmitters to send different types of information downstream using different wavelengths of light, and these additional transmissions could adversely affect the operation of receiver 28 and/or laser 24. One additional benefit of removing a fourth band of wavelengths as discussed above is that this may allow NIU 10 to continue to process a single downstream band of wavelengths in the event that additional downstream wavelengths are added to the system.

If second filter 34 were configured to filter at least a band of wavelengths from 1530 to 1550 nm, for example, a later-added, second downstream band of wavelengths in this range would be substantially prevented from reaching laser 24. An NIU such as NIU 10, configured for use in a system that sends downstream information in a single band of wavelengths, could continue to be used in a system that had been modified to transmit downstream information in two or more bands of wavelengths, and it would not need to be upgraded to protect it from these newly added signals.

Upstream transmission by laser 24 often occurs in the band of frequencies at or around 1310 nanometers. However, it is also known to transmit upstream signals with laser 24 in a band of wavelengths above the 1550 to 1560 nanometer range, at approximately 1610 nm, for example, although temperature variations may produce an actual transmission wavelength in the 1600 to 1620 range, for example. In this case, the fourth band of wavelengths can include wavelengths greater than 1560 and can extend as close to the upstream transmission band of wavelengths as is practicable based on the error in the transmission wavelengths of the upstream laser 24.

Figure 3:
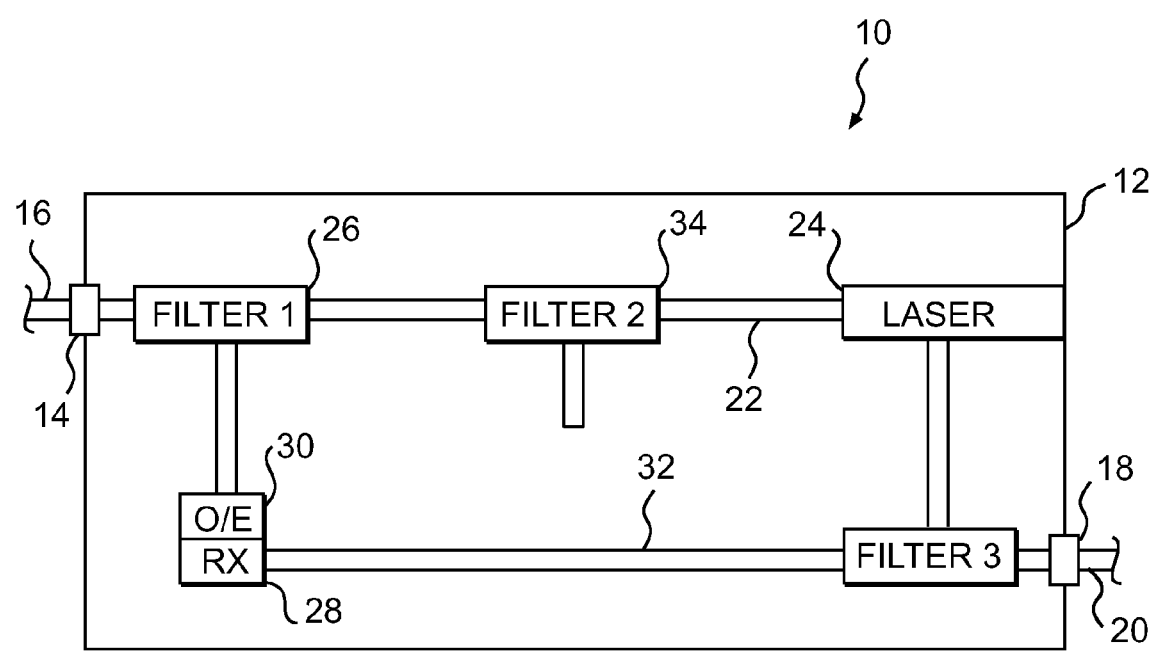
FIG. 3 is a schematic illustration of an NIU according to another embodiment of the present invention.

Once the unwanted downstream signals have been removed from the optical pathway 22 by second filter 34, care should be taken to substantially prevent these signals from being reflected back into the optical pathway 22. Various methods are known for terminating an optical fiber or the output of a filter and dissipating the optical energy on the optical fiber. For example, an optical terminator 36 may be connected to the output of second filter 34 to absorb or destroy the filtered signals without further processing. The optical terminator may comprise an index matching gel covering the cleaved end of the fiber, the fiber being cleaved at an angle to substantially prevent back reflection, or a diffuser for absorbing or, dissipating the light without reflecting it back to the fiber. Alternately, as illustrated in FIG. 3, the output of second filter 34 may emit light into the interior of the NIU 10 to keep the cost of the unit low and reduce the likelihood of light reflecting back into the optical pathway 22. It is also possible to crush the end of the fiber which also substantially prevents back reflection. Any arrangement that dissipates or absorbs or directs the noise or light in the fourth wavelength band away from the optical pathway 22 could be used.

Figure 4:
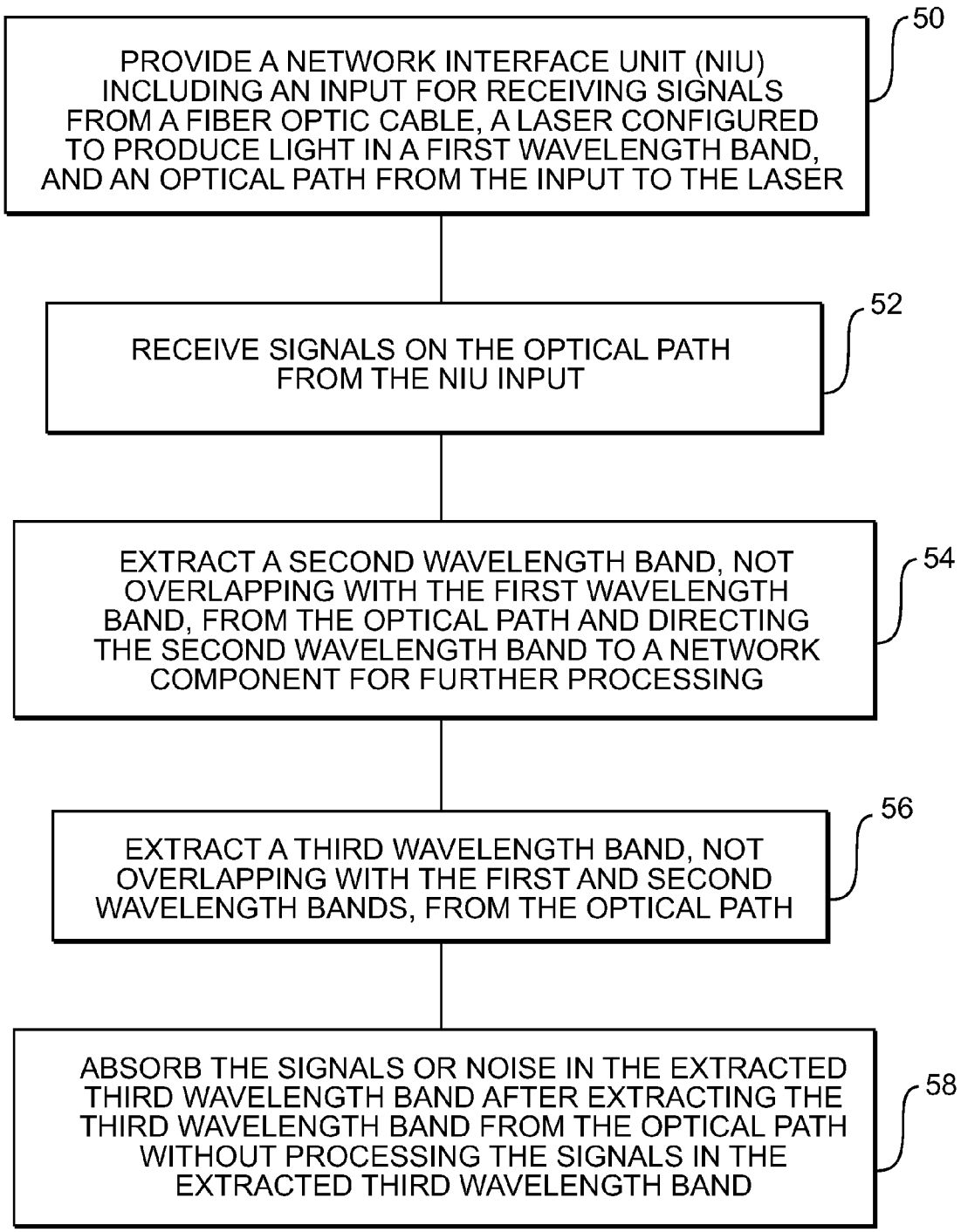
FIG. 4 is a flow chart illustrating a method according to an embodiment of the present invention.

A method according to an embodiment of the present invention is illustrated in FIG. 4 and includes a block 50 of providing a network interface unit (NIU) including an input for receiving signals from a fiber optic cable, a laser configured to produce light in a first wavelength band, and an optical path from the input to the laser, a block 52 of receiving signals on the optical path from the NIU input and a block 54 of extracting a second wavelength band, not overlapping with the first wavelength band, from the optical path and directing the second wavelength band to a network component for further processing. The method also includes a block 56 of extracting a third wavelength band, not overlapping with the first and second wavelength bands, from the optical path and a block 58 of dissipate the signals or noise in extracted third wavelength band after extracting the third wavelength band from the optical path without processing the signals in the extracted third wavelength band.

The present invention has been described herein in terms of several presently preferred embodiments. However, modifications and additions to these embodiments will become apparent to those of ordinary skill in the relevant arts upon a reading of the foregoing disclosure. It is intended that all such additions and modifications comprise a part of the present invention to the extent they fall within the scope of the several claims appended hereto.

What is claimed is:

1. A network interface unit (NIU) comprising:
   an input for receiving downstream signals from an optical fiber;
   an optical pathway leading from the input;
   a laser connected to the optical pathway for transmitting upstream signals to the optical fiber in a first wavelength band;
   a receiver for receiving downstream signals in a second wavelength band, the second wavelength band not overlapping with said first wavelength band;
   a first filter between the input and the receiver for filtering signals in a third wavelength band from the optical pathway before signals in said third wavelength band reach said receiver, said third wavelength band including said second wavelength band;
   a second filter between the input and the laser for filtering signals in a fourth wavelength band from said optical pathway, said fourth wavelength band not overlapping with said first wavelength band or said third wavelength band; and
   means for preventing processing of the fourth wavelength band downstream of the second filter,
   wherein said fourth wavelength band comprises a first portion below said first wavelength band and a second portion above said first wavelength band.

2. The NIU of claim 1 further including optical-electrical converter means for converting optical signals in the second wavelength band to electric signals.

3. The NIU of claim 1 wherein said fourth wavelength band is between said first wavelength band and said third wavelength band.

4. The NIU of claim 1 wherein said fourth wavelength band extends from said third wavelength band to said first wavelength band.

5. The NIU of claim 1 wherein said first wavelength band is above said third wavelength band.

6. The NIU of claim 1 wherein said means for preventing comprises an optical fiber terminator.

7. The NIU of claim 1 wherein said means for preventing comprises an unterminated optical fiber.

8. The NIU of claim 1 wherein said means for preventing comprises an output of said second filter.

9. A method comprising:
   providing a network interface unit (NIU) including an input for receiving signals from a fiber optic cable, a laser configured to produce light in a first wavelength band, a receiver for receiving signals in a second wavelength band not overlapping with the first wavelength band, and an optical path from the input to the laser;
   receiving signals on the optical path from the NIU input;
   extracting a third wavelength band including the second wavelength band, from the optical path and directing the third wavelength band to a network component for further processing;
   extracting a fourth wavelength band, not overlapping with the first and third wavelength bands, from the optical path; and
   dissipating the signals or impairments in the extracted fourth wavelength band after extracting the fourth wavelength band from the optical path without processing the signals in the extracted fourth wavelength band.

10. The method of claim 9 including performing optical-electrical conversion on the extracted third wavelength band.

11. The method of claim 9 wherein extracting a fourth wavelength band comprises extracting a fourth wavelength band between said first wavelength band and said third wavelength band.

12. The method of claim 9 including transmitting upstream signals in said first wavelength band using the laser.

13. The method of claim 9 including directing the signals or noise in the extracted fourth wavelength band to an optical pathway and into an optical fiber terminator.

14. A network interface unit (NIU) comprising:
- an input for receiving downstream signals from an optical fiber;
- a laser for transmitting upstream signals on the optical fiber in a first wavelength band;
- an optical pathway from the input to the laser;
- a receiver for receiving signals in a second wavelength band, said second wavelength band not overlapping with said first wavelength band;
- a first filter between the input and the receiver for removing signals in a third wavelength band from the optical pathway before the signals in the third wavelength band reach said receiver, said third wavelength band including said second wavelength band; and
- a second filter between the input and the laser for removing impairments from the optical pathway in a fourth wavelength band, the fourth wavelength band not overlapping with said first wavelength band or said third wavelength band, and
- a dissipating element for preventing the fourth wavelength band from being processed.

15. The NIU of claim 14 further including optical-electric converter means for converting optical signals in the second wavelength band to electric signals.

16. The NIU of claim 14 wherein said fourth wavelength band is between said first wavelength band and said third wavelength band.

17. The NIU of claim 14 wherein the dissipating element comprises means for absorbing the noise after the noise is filtered from the optical pathway.

18. The NIU of claim 14, wherein the dissipating element comprises an optical fiber termination element or an unterminated optical fiber.

19. The NIU of claim 14, wherein the dissipating element is located downstream from the second filter.

* * * * *